United States Patent [19]

Rubin

[11] Patent Number: 4,666,025
[45] Date of Patent: May 19, 1987

[54] RETRACTION MEANS FOR FRICTION MEMBERS IN FRICTION COUPLING BRAKES AND CLUTCHES

[75] Inventor: Alexander M. Rubin, University City, Mo.

[73] Assignee: Magnetic Power Systems, Inc., Fenton, Mo.

[21] Appl. No.: 729,668

[22] Filed: May 2, 1985

[51] Int. Cl.$^4$ ............... F16D 55/228; F16D 13/69; F16D 25/064
[52] U.S. Cl. ............... 192/70.28; 188/72.3; 188/73.38; 188/370; 267/158
[58] Field of Search ............ 188/72.3, 216, 73.38, 188/370, 24.21; 267/158, 165; 192/70.28, 85 A

[56] References Cited

U.S. PATENT DOCUMENTS

| | | | |
|---|---|---|---|
| 2,994,410 | 8/1961 | Burnett | 188/370 X |
| 3,605,956 | 9/1971 | Hahm et al. | 188/72.3 |
| 3,730,306 | 5/1973 | Rath | 188/370 X |
| 3,910,392 | 10/1975 | Foers | 192/70.28 X |
| 4,301,894 | 11/1981 | Arai | 188/216 X |
| 4,353,450 | 10/1982 | Wakefield | 192/84 C |
| 4,364,455 | 12/1982 | Oshima | 188/72.3 X |

FOREIGN PATENT DOCUMENTS 1284722 12/1968 Fed. Rep. of Germany ..... 188/72.3
1093809 12/1967 United Kingdom ............ 188/24.21

OTHER PUBLICATIONS

"... and Disc Brake by Dunlop", *The Motor*, Jan. 19, 1955, (pp. 975 to 978).

*Primary Examiner*—Rodney H. Bonck
*Assistant Examiner*—David A. Testardi
*Attorney, Agent, or Firm*—Haverstock, Garrett & Roberts

[57] ABSTRACT

A spring member for use in a disc type friction coupling mechanism for urging the movable friction members associated with such devices toward their inoperative retracted positions, the spring member having a planar loop portion and at least one arm portion associated therewith, each of the arm portions being angularly displaced relative to the plane of the loop portion, the loop portion being removably attachable to the actuator assembly such that each spring arm portion respectively engages a friction member on the actuator assembly to urge the friction member engaged therewith toward its inoperative retracted position.

6 Claims, 8 Drawing Figures

RETRACTION MEANS FOR FRICTION MEMBERS IN FRICTION COUPLING BRAKES AND CLUTCHES

The present invention relates to an improved retracting mechanism for use on disc type friction coupling brakes and clutches for returning and holding the movable friction members associated with such devices in their respective inoperative no-drag positions when actuating fluid pressure is removed therefrom. Although the present retracting mechanism is primarily designed for use with actuator assemblies having two movable friction members associated with one or both opposite sides thereof, the present mechanism is also adaptable for use with actuator assemblies utilizing a single friction member.

The use of actuator assemblies having fluid actuated friction members associated with one or both opposite sides thereof adaptable to be forcibly thrust outwardly into frictional engagement with one or more rotating disc members is quite common in friction coupling mechanisms and such actuator devices have a wide variety of applications including tension control and torque applications in the converting, paper and packaging industries. One of the problems associated with friction coupling brake and/or clutch assemblies is the inability to completely disengage the fluid actuated friction members from the rotating disc members upon reduction and eventual subsidence of the fluid pressure from the actuator assembly housing the friction members. Typically, once the actuating fluid pressure is completely removed from the actuating chambers associated with each respective friction member, the friction members tend to remain engaged with their corresponding disc member thereby creating drag torque in the brake and/or clutch mechanism. This drag torque occurs due to the pressure difference existing between the opposed surfaces of each friction member at the high rpms associated with the rotating disc member to which they are engaged and, also, due to the relative friction between the friction members and their associated guide means. If this condition is allowed to continue, excessive wear, deterioration and eventual damage to the friction members and/or the rotating disc members may occur. Such drag torque condition may also interfere with the precise and accurate regulation of braking torque required for a particular job application.

Although some systems have been developed to return and maintain the friction members in their inoperative retracted positions upon subsidence of fluid pressure to the actuator assembly, many of these systems require relatively complicated mechanisms such as the multiple spring and magnet mechanisms internally housed within the friction coupling device disclosed in U.S. Pat. No. 3,311,205. Such mechanisms require the use of multiple components; they are not easily accessed for maintenance and replacement of parts due to the fact that such mechanisms are internally housed within the actuator assembly; and inspection, maintenance and service of such mechanisms often requires considerable downtime of equipment in order to accomplish the same. In addition, such mechanisms are costly and are relatively easily susceptible to failure due to the large number of components required and the complexity of the mechanisms. Simple and accessible means for eliminating the drag torque inherent in a friction coupling disc type brake and/or clutch system is therefore not only highly desirable but it is also important for the effective and efficient operation of the friction coupling mechanism.

The present retracting mechanism overcomes many of the limitations and shortcomings associated with known mechanisms and teaches the construction and operation of a relatively simple, easily accessible and inexpensive retracting means for friction members utilized in disc type friction coupling brakes and/or clutches. More particularly, the present retraction mechanism comprises a specially configured pre-loaded spring member including a central or middle portion having a substantially closed loop formed at one end portion thereof and a pair of opposed arm portions associated with the opposite ends thereof, each of said pair of opposed arm portions being respectively adaptable for engaging a movable friction member located on the actuator assembly. The present spring member is removably attachable to the exterior portion of the actuator assembly and is positioned and located on one or both opposite sides thereof depending upon the location of the friction members associated therewith such that each spring arm portion may be respectively engaged with a friction member located on that particular side of the actuator assembly. In this regard, each friction member includes cooperatively engageable means for receiving and holding the respective arm portions of the present spring member. The use of movable friction members on one or both opposite sides of the actuator assembly will depend upon whether such actuator assembly will be utilized in a single or double disc friction coupling system.

Regardless of the number of rotating disc members used in a particular system, when attached to the actuator assembly and engaged with the corresponding friction members, each opposed arm portion of the present spring member exerts a pre-determined biasing force against its respective friction member to urge and maintain said friction member in its inoperative no-drag position. When actuating fluid pressure is introduced into the actuator assembly, the friction members are forced outwardly away from the actuator assembly into frictional engagement with their corresponding rotating disc member. Because each friction member is normally biased towards its retracted no-drag position by the corresponding arm portion of the spring member engaged therewith, when a fluid medium is introduced into the actuator assembly, the pressure developed by said fluid medium against said friction member must first overcome the pre-loaded biasing force exerted by the respective spring arm portion before movement thereof can be achieved. This pre-loaded force is determined by the special configuration of the present spring member and, more specifically, by the amount of angular deflection of the opposed arm portions of the spring member relative to the central portion thereof when said spring member is attached in operative position to the actuator assembly and its corresponding friction members. Depending upon the particular job application, this pre-loaded force may be easily changed by simply adjusting the angular deflection of the spring arm portions relative to the central or middle portion of the spring member prior to attachment to the actuator assembly. The size of the spring member and the material used will also affect the spring biasing force and this force can likewise be changed by changing the size or material of the spring such as by using a different gauge of wire or other resilient material. Upon subsidence of the actuating fluid pressure to each respective friction member, the respective arm portions of the present spring member will automatically return said friction members to their inoperative no-drag position regardless of the operating rpm associated with the rotating disc member to which they are engaged. This effectively eliminates the drag torque condition associated with the pressure differential between the opposed side surfaces of each respective friction member at high operating disc speeds. Because the present retracting means is located on the exterior portions of the actuator assembly, installation and removal does not require disassembly of the actuator assembly and can be easily accomplished in minimal time. Inspection, replacement, maintenance and service of the present retracting mechanism also results in minimal downtime of equipment.

It is a principal object of the present invention to improve the operating efficiency of disc type friction coupling mechanisms.

Another object is to provide an improved retraction mechanism that is structurally and operationally relatively simple and inexpensive.

Another object is to provide a simple retraction mechanism for completely disengaging the fluid actuated friction members from their corresponding rotating disc members upon reduction and subsidence of the actuating fluid pressure to said members.

Another object is to provide a simple means for completely eliminating the drag torque which commonly occurs in disc type friction coupling mechanisms upon subsidence of the actuating fluid pressure to said mechanism.

Another object is to teach the construction and operation of a spring member wherein the pre-loaded force associated with each opposite end thereof is determined by the spring size, the material used, and the amount of angular deflection of said opposite ends relative to the central portion of said spring member when said spring member is attached to the actuator assembly and engaged with the respective friction members.

Another object is to teach the construction and operation of a retracting mechanism wherein the pre-loaded force associated therewith may be easily changed depending upon the particular job application.

Another object is to provide a retraction mechanism that will not damage the brake or clutch unit to which it is attached if said retraction mechanism should break.

Another object is to provide a retracting mechanism that is lightweight, durable and requires relatively little maintenance.

Another object is to provide a retracting mechanism which can be easily accessed for inspection, maintenance and service.

Another object is to provide a retracting mechanism which is easy to install, service and maintain.

Another object is to provide a simple retracting mechanism which can be easily and quickly attached to and removed from the external portion of the actuator assembly housing the movable friction members.

These and other objects and advantages of the present invention will become apparent to those skilled in the art after considering the following detailed specification in conjunction with the accompanying drawings, wherein.

Figure 1:
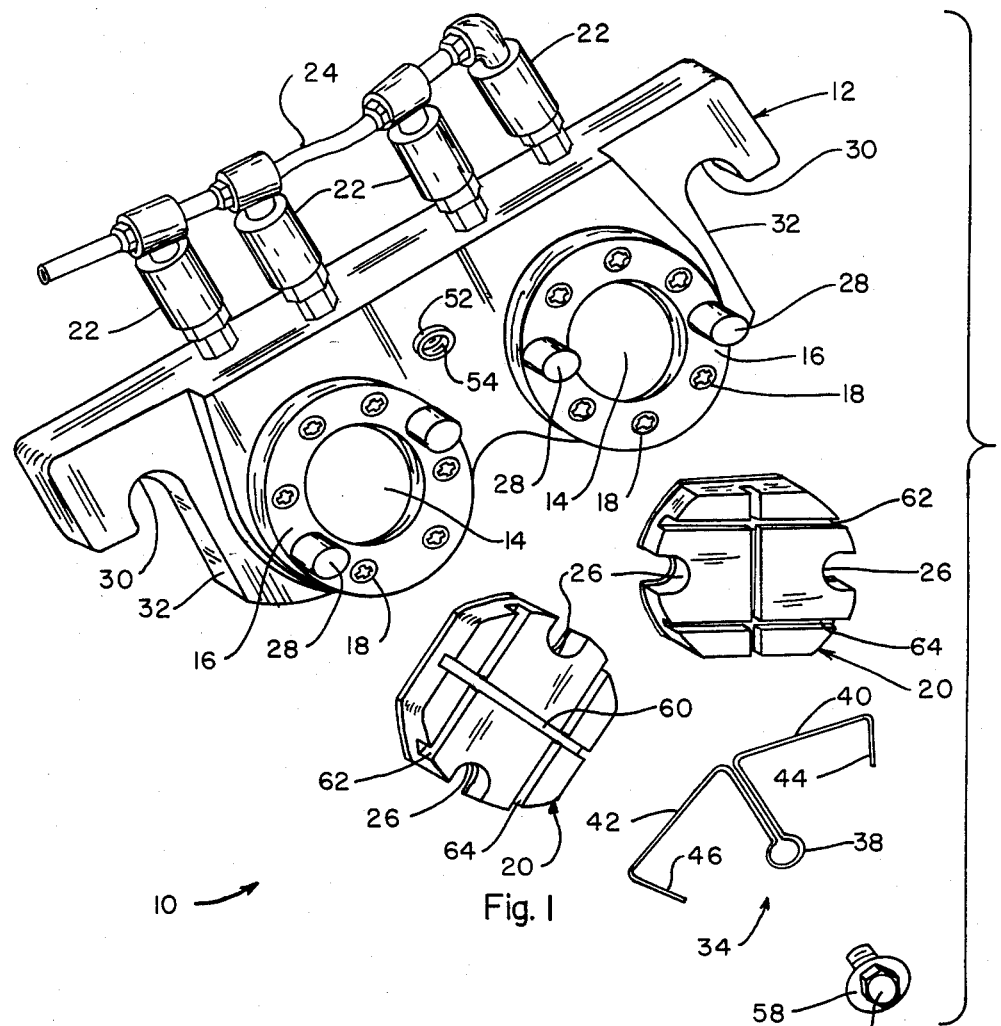
FIG. 1 is an exploded perspective view of an actuator assembly equipped with retracting means constructed according to the teachings of the present invention.

Referring to the drawings more particularly by reference numbers wherein like numerals refer to like parts, number 10 in FIG. 1 illustrates an exploded view of a typical actuator assembly used in disc type friction coupling system equipped with the present retracting means 34. The actuator assembly 10 includes an actuator housing 12 having a pair of individual segregated cavities 14 located on at least one side thereof for receiving and holding a movable flexible diaphram member (not shown) therewithin. Each diaphragm member is securely held within its respective cavity 14 by a retainer ring member 16, each retainer member 16 being securely attached to the actuator housing 12 by any suitable means such as by using a plurality of fasteners 18 as shown in FIG. 1. Outwardly movable friction members or pads such as the friction members 20 are positioned over the respective cavities 14 and against the respective retainer members 16 such that when fluid pressure in introduced into each respective cavity 14, each diaphragm member is flexed outwardly into engagement with the friction member 20 positioned thereover thereby moving the friction member into frictional contact with a rotating disc member (not shown) associated with the friction coupling mechanism.

Each of cavities 14 has a separate inlet passageway 21 (FIG. 7) as therewith for supplying fluid under pressure thereto, one end of each of said passageways 21 lying in communication with its respective cavity 14 and the opposite end thereof terminating adjacent to an edge portion of the actuator housing 12 and being adaptable for communicating with valving such as conventional valve members 22 (FIG. 1). Flexible tubing such as the tubing 24 interconnects the respective valve members 22 in a suitable manner to a common fluid source. This means that the fluid supply to each cavity 14 can be independently controlled and regulated by the respective valves 22. Although the actuator assembly 10 shown in FIG. 1 discloses the use of four valve mechanisms for controlling the movement of two friction members 20 on each opposite side thereof, it is anticipated that the actuator assembly may include any number of cavities/friction members on each respective side thereof and a corresponding number of respective valve mechanisms for independently regulating the fluid supply thereto depending upon the particular application requirements.

When the actuator assembly 10 is mounted for operation in a friction coupling mechanism, respective mounting studs (not shown) are receivable within and extend through parallel slots 30 (FIG. 1) located at each opposite end of the actuator housing 12 for locating, holding and supporting the actuator assembly in operative position. The mounting studs are typically fixedly connected to a mounting fixture associated with the particular machine to which the friction coupling mechanism is mounted. When the actuator assembly 10 is mounted on the two mounting studs, a nut is threaded onto the threaded free end portion of each mounting stud for securing the actuator assembly between the nut and a shoulder formed on the fixed stud. It is important to note that each slot 30 has an extended inner side wall 32 associated therewith, the extended side walls 32 being parallel to one another and acting as stops to prevent pivoting of the actuator assembly about either mounting stud when the mounting studs are positioned within the respective slots 30. These extended inner side walls 32 also act as guide walls during installation and removal of the actuator assembly 10 requiring that the two ends of the actuator assembly be moved simultaneously inwardly or outwardly toward or away from the mounting studs.

It should also be noted that each friction member 20 includes a pair of opposed slots 26 (FIGS. 1 and 5) positioned so as to be adaptable to receive a respective pair of guide posts 28 associated with each retainer member 16. When positioned against the retainer member 16, the guide posts 28 are receivable within the slots 26 and serve as a means for locating and guiding the friction members 20 during movements thereof including when moved into and out of frictional engagement with the rotating disc members. Although the particular structure associated with the actuator assembly 10 shown in FIG. 1 has been described in some detail, it is likewise recognized that other actuator assemblies having different structural features as compared to the actuator assembly shown in FIG. 1 may likewise be utilized in conjunction with the present retraction means 34 as will be hereinafter explained.

Figure 4:
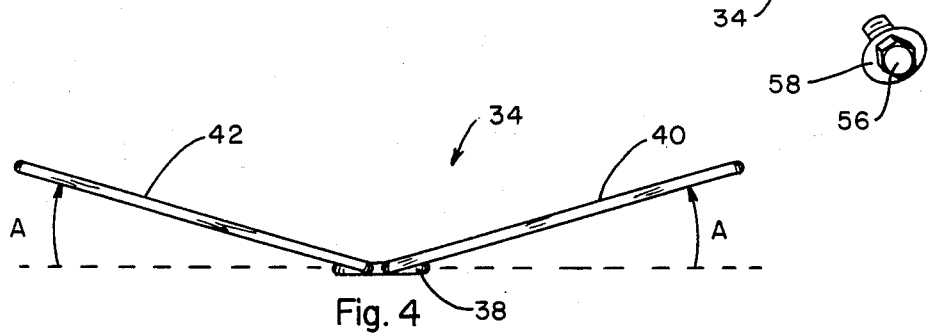
FIG. 4 is a top plan view of the spring member shown in FIG. 1.
Figures 2, 3:
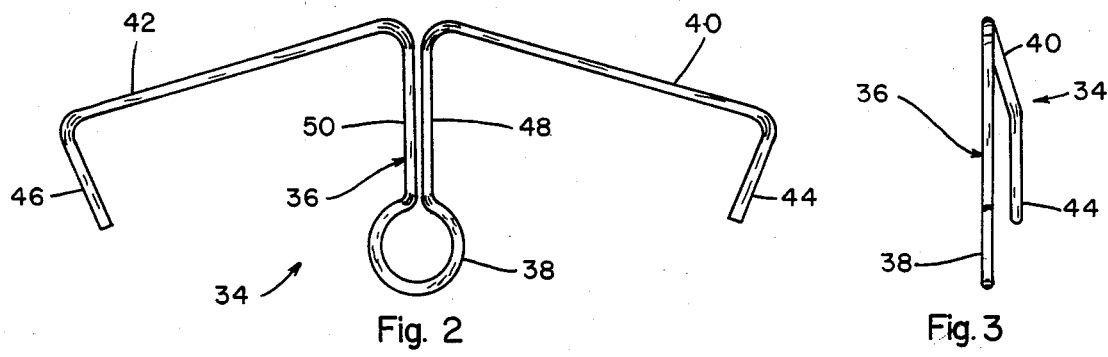
FIG. 2 is a front elevational view of the spring member shown in FIG. 1.
FIG. 3 is a side elevational view of the spring member shown in FIG. 1.

The present retracting means comprises a specially configured spring member 34 (FIGS. 2-4) made of a resilient type material such as a spring steel, music wire or other types of resilient metal material adaptable for both achieving and withstanding the particular biasing forces required and without losing their springiness. Although it is preferred that the present spring member 34 be formed of a resilient metal material for strength and durability, it is also recognized that other non-metallic materials having similar resilient properties could likewise be utilized. The present spring member 34 is preferably of a one-piece formed wire member having a central or middle portion 36 with a substantially closed loop 38 formed thereby and a pair of opposed outwardly extending arm portions 40 and 42 forming the opposite ends thereof as best shown in FIG. 2. The arm portions 40 and 42 extend in mutually opposite directions from the central portion 36 and each arm portion is formed to extend at an angle to the plane of the central portion 36 illustrated by the angular displacement angle A shown in FIG. 4. The amount of angular deflection A between the respective arm portions 40 and 42 and the plane passing through the central portion 36 of the spring member 34 determines the pre-loaded biasing force associated with the member 34 when said member is attached to the actuator housing 12 and has its arm portions engaged with respective friction members as will be explained. The arms portions 40 and 42 include flanged end portions 44 and 46 which are shown substantially at right angles to the portions 40 and 42 as best shown in FIG. 2. The flanged end portions 44 and 46 are engageable with a respective groove 60 in the friction members 20 for normally biasing said friction members toward their retracted or no-drag positions. Although the central portion 36 of the spring member 34 depicted in FIGS. 1 and 2 includes two parallel portions 48 and 50, it is recognized that the central spring portion 36 can be made as a unitary piece depending upon the material used.

Figure 6:
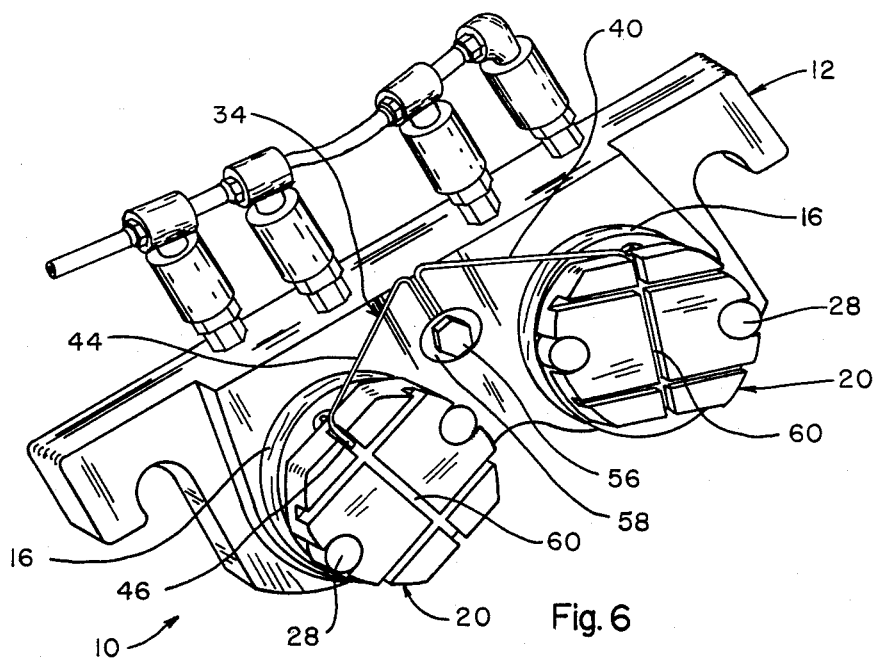
FIG. 6 is a perspective view showing the present spring member attached to the actuator assembly and engaged with its corresponding friction members.

The actuator housing 12 includes a raised projection or boss 52 located between the retainer rings 16 as shown in FIG. 1, the projection or boss 52 having a threaded opening 54 positioned therein. The present spring member 34 attaches to the actuator housing 12 by placing the looped portion 38 thereof around the boss 52 and thereafter securing the same by threading a fastening member such as the fastener 56 into the opening 54 of the boss 52 as shown in FIG. 6. It is important that the shape and size of the boss 52 be substantially similar to the shape and size of the looped portion 38 of the spring member 34 so that the looped portion 38 will tightly fit around the boss 52. This helps to secure the spring member 34 to the actuator housing 12 and further reduces the possibility that the spring member 34 will rotate or otherwise slip about the boss 52 during operation. The fastener 56 may include a head or flanged portion such as the flanged portion 58 (FIGS. 1 and 6) of sufficient size to extend beyond the side edges of the boss 52 and overlie the looped portion 38 of the spring member 34 positioned therearound. This likewise helps to prevent the looped portion 38 from popping off or becoming otherwise disengaged from the boss 52 when pressure is applied to the friction members 20. The flange 58 may be formed integral with the fastener 56 or it may be in the form of a washer or other similar member which can be positioned between the free end of the boss 52 and the head of the fastener 56. The depth of the raised projection or boss 52 should be dimensioned such that the flange 58 will provide some freedom of movement of the looped portion 38 when the fastener 56 is threadedly secured to the boss 52. Once the arm portions 40 and 42 are attached to the respective friction members as will be hereinafter explained, the looped portion 38 is restrained from rotational movement about the boss 52. The orientation of the spring member 34 relative to the actuator housing 12 when attached thereto is important to the operation as will be also further explained hereinafter.

Figure 7:
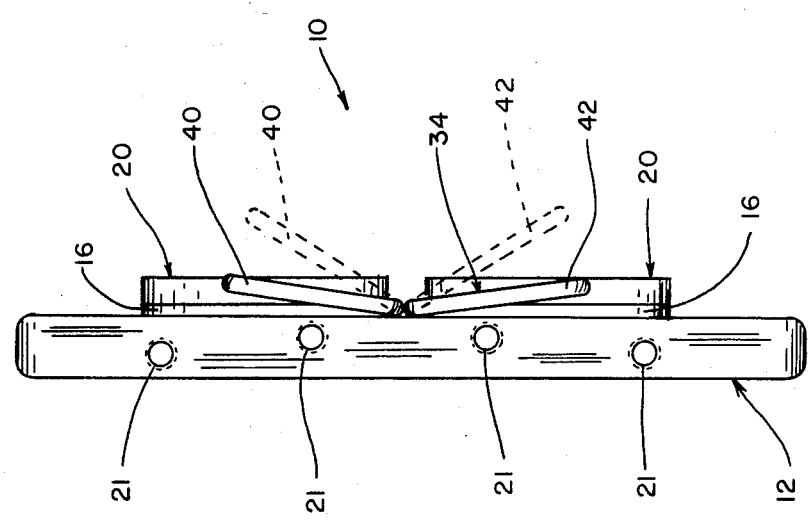
FIG. 7 is a top plan view of the assembled actuator assembly of FIG. 1 with the valving 22 removed therefrom showing the present spring member engaged with its corresponding friction members, substantial deflection of the opposed arm portions of the spring member being shown in dotted outline form.

Once the spring member 34 is attached to the actuator housing 12 as previously described, the opposed arm portions 40 and 42 attach to the respective friction members 20 by simply inserting the respective flanged end portions 44 and 46 into a complementary groove 60 formed within each friction member 20 as best shown in FIGS. 6 and 7. Since the spring member 34 is made of a resilient type material, the arm portions 40 and 42 are easily deflected so as to insert the flanged portions 44 and 46 into the grooves 60. It therefore is important that the spring member 34 be positioned on the actuator housing 12 such that, when attached thereto, the respective arm portions 40 and 42 are cantilevered and torsionally deflected in a direction opposite from the angular displacement A shown in FIG. 4. This establishes the pre-loaded biasing force of the spring member 34 and establishes a continuing tendency for the deflected arm portions 40 and 42 to return to their undeflected condition. This force will also be in a direction to automatically return the friction members 20 engaged therewith to their inoperative no-drag positions upon subsidence of the actuating fluid pressure thereto. When attached as described, the engagement of the flanged end portions 44 and 46 with the grooves 60 holds the spring member 34 in proper position and prevents the looped portion 38 from rotating about the boss 52. It is important that the spring member 34 be mounted on the actuator housing 12 so as not to interfere with the mounting of the actuator assembly within the friction coupling mechanism.

The groove 60 in each of the friction members 20 extends midway across the active surface thereof between the slots 26 (FIGS. 1 and 5) and in this position is located to receive the respective flanged end portions 44 or 46 when said spring member is attached to the actuator housing 12 (FIG. 6). The positioning of the grooves 60 and the boss 52 must be such that when the spring member 34 is attached to the actuator housing 12, the flanged end portions 44 and 46 will engage the respective grooves 60 associated with the friction members 20. The grooves 60 should likewise be deep enough to fully receive the flanged end portions 44 and 46 so that these portions will lie below the active surface of the members 20 when frictionally engaged with a rotating disc member. In addition, since the grooves 60 extend across the width of the friction members 20, the members 20 cannot be mounted in error. This is advantageous because it means that when the friction members 20 are initially installed and/or removed for cleaning, replacement or for other purposes, the person doing so does not need to concern himself with proper orientation and the members 20 can be easily and quickly reinstalled. Although the grooves 60 are the only grooves necessary on each friction member 20 for cooperatively engaging the spring member 34, additional grooves such as the grooves 62 and 64 (FIGS. 1 and 5) may also be provided for other purposes such as for controlling the dissipation of heat when said members are operating.

FIGS. 6 and 7 show the present spring member 34 attached to the actuator housing 12 and engaged with the associated friction members 20. When the friction members 20 are in their inoperative retracted position, the spring arm portions 40 and 42 through the flanged end portions 44 and 46 exert a pre-determined biasing force against each respective friction member 20 due to the cantilevered and torsional deflection thereof as previously explained to urge and maintain said friction members in their inoperative retracted positions. The amount of torsional and cantilevered deflection of the opposed spring arm portions 40 and 42 when the spring member 34 is attached to the actuator housing 12 and engaged with the corresponding friction members 20 determines the pre-loaded biasing force exerted thereby. The strength and size of the material used will also influence the biasing force of the spring member 34. As previously explained, depending upon the particular job application, this pre-loaded biasing force may be easily changed by simply changing the size and/or material of the spring member 34 and/or by adjusting the amount of the angular displacement A (FIG. 4) between the respective portions 40 and 42 and the central portion 36 of the spring member 34 prior to attachment thereof to the actuator housing 12. Upon subsidence of the actuating fluid pressure to each respective friction member, the respective arm portions of the spring member 34 will automatically disengage the friction members from their corresponding rotating disc member and return said friction members to their inoperative retracted no-drag positions. The pre-loaded spring arm portions 40 and 42 therefore yieldably oppose movement of the friction members engaged therewith away from their inoperative retracted positions and actively exert a biasing force thereagainst to retract and return the members 20 to their inoperative no-drag positions when the actuating fluid pressure is removed therefrom. The stressed deflection of the spring arm portions 40 and 42 are shown in dotted outline form in FIG. 7.

It is important to note that as the friction members 20 wear, the retracting force of the spring member 34 will increase since the friction members 20 will have to travel a greater distance in order to engage their respective rotating disc members. The greater the distance traveled by the friction members 20 to engage their respective disc members, the greater will be the torsional and cantilevered deflection of the arm portions 40 and 42 thereby resulting in a somewhat increased initial retracting force upon subsidence of the actuating fluid to each respective friction member. Since the present retracting means 34 is located on the exterior portion of the actuator housing 12 and is easily attached thereto by conventional fastening means, installation and removal thereof does not require disassembly of the entire actuator assembly 10 and such installation and/or removal can be easily accomplished in minimal time. In addition, inspection, maintenance and service of the present retracting mechanism results in minimal downtime of equipment.

Figure 5:
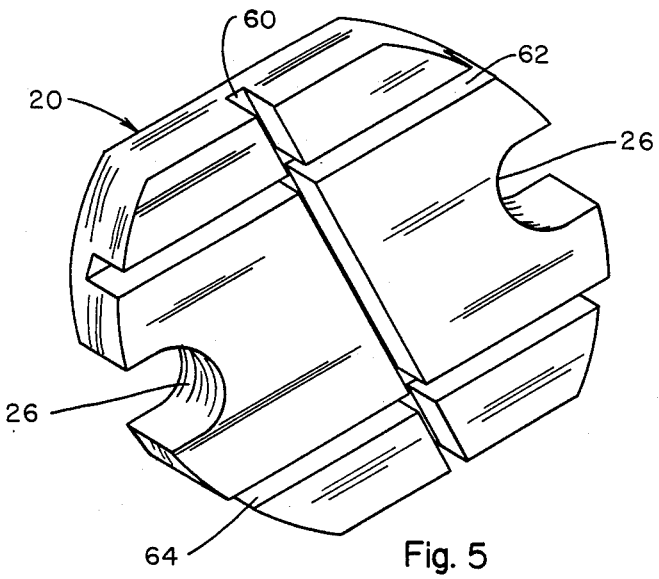
FIG. 5 is a perspective view of the friction member shown in FIG. 1, said friction member being constructed according to the teachings of the present invention.
Figure 8:
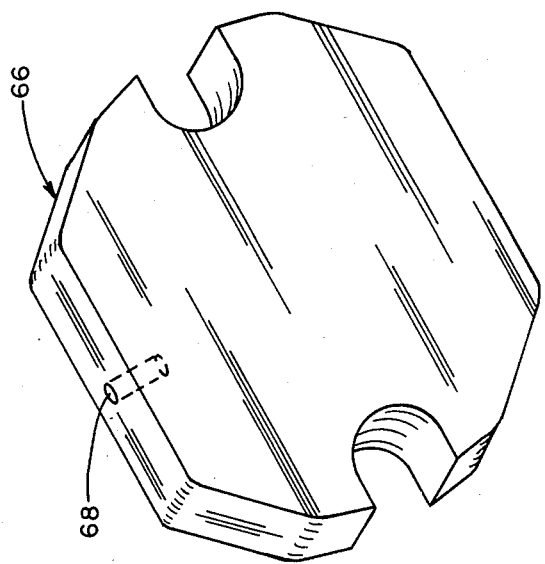
FIG. 8 is a perspective view showing an alternative embodiment of the friction member of FIG. 5.

FIG. 8 discloses an alternative embodiment of the friction member 20 shown in FIG. 5. More particularly, FIG. 8 discloses a friction member 66 which is substantially similar in construction and operation to the friction member 20 disclosed in FIG. 5 but differs therefrom in that the groove 60 associated with each friction member 20 for cooperatively receiving and holding the respective arm portions of the spring member 34 as well as the grooves 62 and 64 located on the engaging face of each of said members are eliminated therefrom. Instead, the friction member 66 includes an opening 68 located intermediately along the side edge thereof as shown in FIG. 8 for cooperatively receiving and holding the respective flanged end portion 44 or 46 of the spring member 34. As with the groove 60, the opening 68 must be located in such a position so as to register with and engage the flanged end portion 44 or 46 when said spring member is attached to the actuator housing 12. Similarly, the positioning of the opening 68 and the boss 52 must be coordinated as previously explained. In addition, an additional opening (not shown) similar to the opening 68 is located in opposed relationship to the opening 68 such that one of said openings will always be in position to receive the spring end portion regardless of the orientation of the friction member 66. In other respects, the friction member 66 is constructed and arranged similarly to the friction member 20.

Although the use and operation of the present retraction means has been described in combination with an actuator assembly utilizing two movable friction members on one or both opposite sides thereof, the present spring member 34 can likewise be used with actuator assemblies having a single movable friction member located on one or both sides thereof. In this instance, the boss 52 is positioned and located on the actuator housing such that, when the spring member 34 is attached to the boss 52, one of the spring flanged end portions 44 or 46 will be engageable with the cooperatively engageable means located on the friction member. The remaining unattached flanged end portion 44 or 46 may then be located and positioned on the actuator housing so as not to interfere with the operation of the actuator assembly. If this is not possible, the unattached arm or flanged end portion may be appropriately severed without impairing the teachings and practice of the present invention.

Thus there has been shown and described novel retraction means for retracting movable friction members in friction coupling brakes and clutches, which retraction means fulfills all of the objects and advantages sought therefor. Many changes, modifications, variations, and other uses and applications of the present contruction will, however, become apparent to those skilled in the art after considering this specification and the accompanying drawings. All such changes, modifications, variations, and other uses and applications which do not depart from the spirit and scope of the invention are deemed to be covered by the invention which is limited only by the claims which follow.

What is claimed is:

1. A spring member for use on disc type friction coupling devices including at least one actuator assembly having at least two spaced apart fluid actuated friction members each being movable between a retracted inoperative position and an operative position in frictional engagement with a rotatable member, said spring member comprising a formed wire member having a central formed portion including a wire loop portion and a pair of oppositely extending arm members connected thereto, each of said arm members including first and second arm portions, said first arm portions lying substantially in the plane of said wire loop portion and said second arm portions being angularly displaced to a first side of the plane of said wire loop portion, each of said second arm portions having a flanged end portion formed to engage a respective one of said friction members located on the actuator assembly, and means for removably attaching said wire loop portion to the actuator assembly with said flanged end portions engaging the respective friction members such that when said wire loop portion is so attached, said second arm portions are displaced to a second side of said plane of said wire loop portion thereby urging the friction members toward their inoperative retracted positions.

2. The spring member defined in claim 1 wherein each of said friction members have a groove formed therein to receive one of said flanged end portions.

3. The spring member defined in claim 1 wherein said means for removably attaching the wire loop portion of said spring member to the actuator assembly includes a boss formed on the actuator assembly sized to receive the wire loop portion therearound, and fastening means threadedly receivable within said boss.

4. The spring member defined in claim 1 wherein each of said friction members has an aperture formed therein in position to cooperatively receive one of said flanged end portions.

5. A spring member defined in claim 1 wherein said wire loop portion is attached to said actuator assembly between said two spaced apart friction members.

6. A spring member for use in a disc type friction coupling mechanism including an actuator assembly having a pair of spaced apart fluid actuated friction members associated with one or both opposite sides thereof, each of said friction members being adaptable for movement between an inoperative retracted position adjacent the actuator assembly and an operative position wherein each of said friction members are frictionally engaged with a rotating disc member, said spring member comprising a loop portion, a pair of opposed arm portions and spring portions connecting said loop portion and said arm portions, each of said opposed arm portions being angularly displaced relative to the plane of said loop portion and each having a flanged end portion formed therewith to engage a respective one of said friction members located on said actuator assembly, means for removably attaching said loop portion to said actuator assembly between said pair of friction members, and means associated with each of said friction members for cooperatively receiving the flanged end portion of one of said opposed arm portions when said spring member is attached to said actuator assembly whereby each of said spring arm portions exerts a biasing force against its respective friction member to urge said friction member towards its inoperative retracted position.

* * * * *

UNITED STATES PATENT OFFICE
CERTIFICATE OF CORRECTION

Patent No. 4,666,025      Dated May 19, 1987

Inventor(s) Alexander M. Rubin

It is certified that error appears in the above-identified patent and that said Letters Patent are hereby corrected as shown below:

Column 4, line 48 "as" should be --associated--.

Column 6, line 5 "Tne" should be --The--.

Signed and Sealed this

Eighteenth Day of August, 1987

Attest:

DONALD J. QUIGG

Attesting Officer        Commissioner of Patents and Trademarks